(12) United States Patent
Boyle et al.

(10) Patent No.: US 7,340,425 B2
(45) Date of Patent: Mar. 4, 2008

(54) METHOD FOR GENERATING A PORTFOLIO OF STOCKS

(75) Inventors: Michael R. Boyle, Batavia, IL (US); Chuck R. Craig, Naperville, IL (US)

(73) Assignee: First Trust Portfolios, L.P., Lisle, IL (US)

( * ) Notice: Subject to any disclaimer, the term of this patent is extended or adjusted under 35 U.S.C. 154(b) by 714 days.

(21) Appl. No.: 10/666,913

(22) Filed: Sep. 19, 2003

(65) Prior Publication Data

US 2005/0038725 A1    Feb. 17, 2005

Related U.S. Application Data

(63) Continuation-in-part of application No. 10/282,657, filed on Oct. 29, 2002.

(51) Int. Cl.
*G06Q 40/00* (2006.01)

(52) U.S. Cl. .................... 705/36 R; 705/35; 705/37

(58) Field of Classification Search ................. 705/10, 705/35–37, 36 R
See application file for complete search history.

(56) References Cited

U.S. PATENT DOCUMENTS

| | | |
|---|---|---|
| 5,132,899 A | 7/1992 | Fox |
| 5,761,442 A | 6/1998 | Barr et al. |
| 5,784,696 A | 7/1998 | Meinikoff |
| 5,819,238 A | 10/1998 | Fernholz |
| 5,884,287 A | 3/1999 | Edesess |
| 5,930,774 A | 7/1999 | Chennault |
| 5,946,667 A | 8/1999 | Tull, Jr. et al. |
| 5,978,778 A | 11/1999 | O'Shaughnessy |
| 6,035,286 A | 3/2000 | Fried |
| 6,088,685 A | 7/2000 | Kiron et al. |
| 6,161,099 A | 12/2000 | Harrington et al. |
| 6,920,432 B1 * | 7/2005 | Carey .................... 705/36 R |
| 7,085,738 B2 * | 8/2006 | Tarrant ................... 705/36 R |
| 2002/0059126 A1 * | 5/2002 | Ricciardi .................. 705/36 |

OTHER PUBLICATIONS

SEC File 333-69772, Form S-6, Initial Registration Statement, FT 567, Nike Securities L.P., Filed On Sep. 21, 2001, pp. 12-14.*

(Continued)

*Primary Examiner*—Hani M. Kazimi
*Assistant Examiner*—Gregory Johnson
(74) *Attorney, Agent, or Firm*—McAndrews, Held & Malloy, Ltd.

(57) ABSTRACT

A method is provided for selecting a portfolio of securities for investment purposes and then deciding the quantity of shares of each selected security in the portfolio. Specifically, the method comprises providing an investment portfolio comprising selected securities from selected economic sectors; weighting the selected economic sectors to provide a sector weight for each selected economic sector; weighting selected securities to provide an intra sector weight for each selected security; weighting a selected security according to its intra sector weight, the sector weight of the selected security's economic sector and a predetermined percentage to provide a dependent weight of a selected security; determining an equal-weighted weight of a selected security according to the sector weight of the selected security's economic sector, the predetermined percentage and the number of securities selected from that economic sector; and adding a selected security's dependent weight to its equal-weighted weight to yield a portfolio weight of that selected security.

19 Claims, 2 Drawing Sheets

OTHER PUBLICATIONS

Lev Dynkin, Jay Hyman, Wei Wu. Journal of Portfolio Management. New York: Fall 2000. vol. 27, Iss. 1, Value of skill in security selection versus asset allocation in credit markets, pp. 20-41.*

Peter A Abken, Milind M Shrikhande. Economic Review—Federal Reserve Bank of Atlanta. Atlanta: Third Quarter 1997. vol. 82, Iss. 3, The role of currency derivatives in internationally diversified portfolios, pp. 34-37 and 39-58.*

* cited by examiner

Figure 2

| | S&P 500 Market Cap. (millions) | | | Selected Sectors Market Cap (millions) | |
|---|---|---|---|---|---|
| | $ 8,910,677.24 | 203↓ | | $ 8,393,048.39 | 205↓ |
| 202↓ Sectors | 201↓ Market Cap. | Weight | | 204↓ Selected Sector Cap. | Selected Sector Weight |
| 4000 | $ 1,850,051.44 | 20.76% | | 1,850,051.44 | 22.04% |
| 4500 | $ 1,462,349.54 | 16.41% | | 1,462,349.54 | 17.42% |
| 3500 | $ 1,366,236.30 | 15.33% | | 1,366,236.30 | 16.28% |
| 3000 | $ 1,045,092.06 | 11.73% | | 1,045,092.06 | 12.45% |
| 2000 | $ 905,112.79 | 10.16% | | 905,112.79 | 10.78% |
| 2500 | $ 882,941.48 | 9.91% | | 882,941.48 | 10.52% |
| 1000 | $ 527,510.63 | 5.92% | | 527,510.63 | 6.29% |
| 5000 | $ 353,754.15 | 3.97% | | 353,754.15 | 4.21% |
| 5500 | $ 275,018.48 | 3.09% | | | |
| 1500 | $ 242,610.37 | 2.72% | | | |
| TOTAL | $8,910,677.24 | 100% | | $8,393,048.39 | 100% |

Figure 3

| | | | Selected Sector Weight | Combined Market Cap. (millions) | | |
|---|---|---|---|---|---|---|
| Five Stocks From Selected Sector 4000 | | | 22.04% 208↓ | 79,509.00 209↓ | | 210↓ |
| 206↓ Stocks | Market Cap | 207↓ Intra Sector Weight | Cap-weighted Weight | Equal-weighted Weight | | Portfolio Weight |
| FII | $ 3,026.56 | 3.81% | 0.336% | 2.645% | | 2.98% |
| MMC | $ 27,686.15 | 34.82% | 3.070% | 2.645% | | 5.72% |
| NFB | $ 5,307.57 | 6.68% | 0.589% | 2.645% | | 3.23% |
| WM | $ 38,894.36 | 48.92% | 4.313% | 2.645% | | 6.96% |
| TROW | $ 4,594.36 | 5.78% | 0.509% | 2.645% | | 3.15% |
| TOTAL | $79,509.00 | 100.00% | 8.817% | 13.225% | | 22.04% |

METHOD FOR GENERATING A PORTFOLIO OF STOCKS

CROSS-REFERENCE TO RELATED APPLICATIONS/INCORPORATION BY REFERENCE

This is a continuation-in-part of U.S. patent application Ser. No. 10/282,657 (hereinafter "the '657 application") filed on Oct. 29, 2002. The entire specification and all the claims of that application are hereby incorporated by reference to provide continuity of disclosure.

BACKGROUND OF THE INVENTION

A unit investment trust (UIT) is a professionally selected, diversified portfolio of stocks, bonds, or other securities that remains as a fixed portfolio throughout the life of the trust. Investors in a UIT purchase units, which represent an undivided ownership in the entire portfolio. Unlike mutual funds, in which the portfolio is actively managed and traded and continuously changes, UITs generally remain fixed for a predetermined period of time. Portfolios are designed to fill a variety of investment needs and risk tolerance levels. They fall into primarily two categories, equity and fixed income.

Equity portfolios are typically classified as either strategies or sectors. Strategy portfolios follow predetermined investment criteria for selecting the stocks for the portfolio. All strategies have three inherent qualities:
1. Simplicity: The strategies seek to out-perform specified indices by selecting portfolios using sound, fundamental and technical, screens that reflect the historical behavior of the securities.
2. Resilience: The strategies must show back-tested results and have staying power even through bear markets.
3. Discipline: The strategies dictate which stocks are chosen for the portfolio; no emotional judgments are made and the strategies always remain the same.

Developing a strategy that robustly meets these criteria can be very difficult, if not elusive. Investment strategies have been illustrated in U.S. Pat. No. 5,978,778 issued to O'Shaughnessy on Nov. 2, 1999 and U.S. Pat. No. 5,132,899 issued to Fox on Jul. 21, 1992.

Further limitations and disadvantages of conventional and traditional approaches will become apparent to one of skill in the art, through comparison of such strategies with the present invention as set forth in the remainder of the present application with reference to the drawings.

SUMMARY OF THE INVENTION

Certain embodiments of the present invention generally relate to selecting a securities portfolio for investment. More particularly, certain embodiments of the present invention relate to an investment strategy for deciding the quantity of shares of each security selected to form an investment portfolio. The investment objective of embodiments of the present invention is to provide an above-average total return from the portfolio. Embodiments of the present invention seek to meet the objective through capital appreciation. Embodiments of the present invention provide a novel security investment strategy and automate the investment strategy.

A method is provided in a computer implementation for determining the quantity of shares of each security selected from a group of available securities to form an investment portfolio. The method comprises:
(1) providing an investment portfolio comprising selected securities from selected economic sectors;
(2) weighting the selected economic sectors to provide a sector weight for each selected economic sector;
(3) weighting selected securities from each selected economic sector to provide an intra sector weight for a selected security;
(4) determining a dependent weight of a selected security according to the selected security's intra sector weight, the sector weight of the selected security's economic sector and a predetermined percentage;
(5) determining an equal-weighted weight of a selected security according to the sector weight of a selected economic sector, the predetermined percentage and the number of selected securities from that selected economic sector; and
(6) adding a selected security's dependent weight to its equal-weighted weight to yield a portfolio weight of that selected security.

These and other advantages and novel features of the present invention, as well as details of an illustrated embodiment thereof, will be more fully understood from the following description and drawings.

BRIEF DESCRIPTION OF THE DRAWINGS

FIG. 2 is an exemplary illustration of selecting and weighting economic sectors according to an embodiment of the present invention.

FIG. 3 is an exemplary illustration of weighting securities within a sector according to an embodiment of the present invention.

DETAILED DESCRIPTION OF THE PREFERRED EMBODIMENTS

Figure 1:
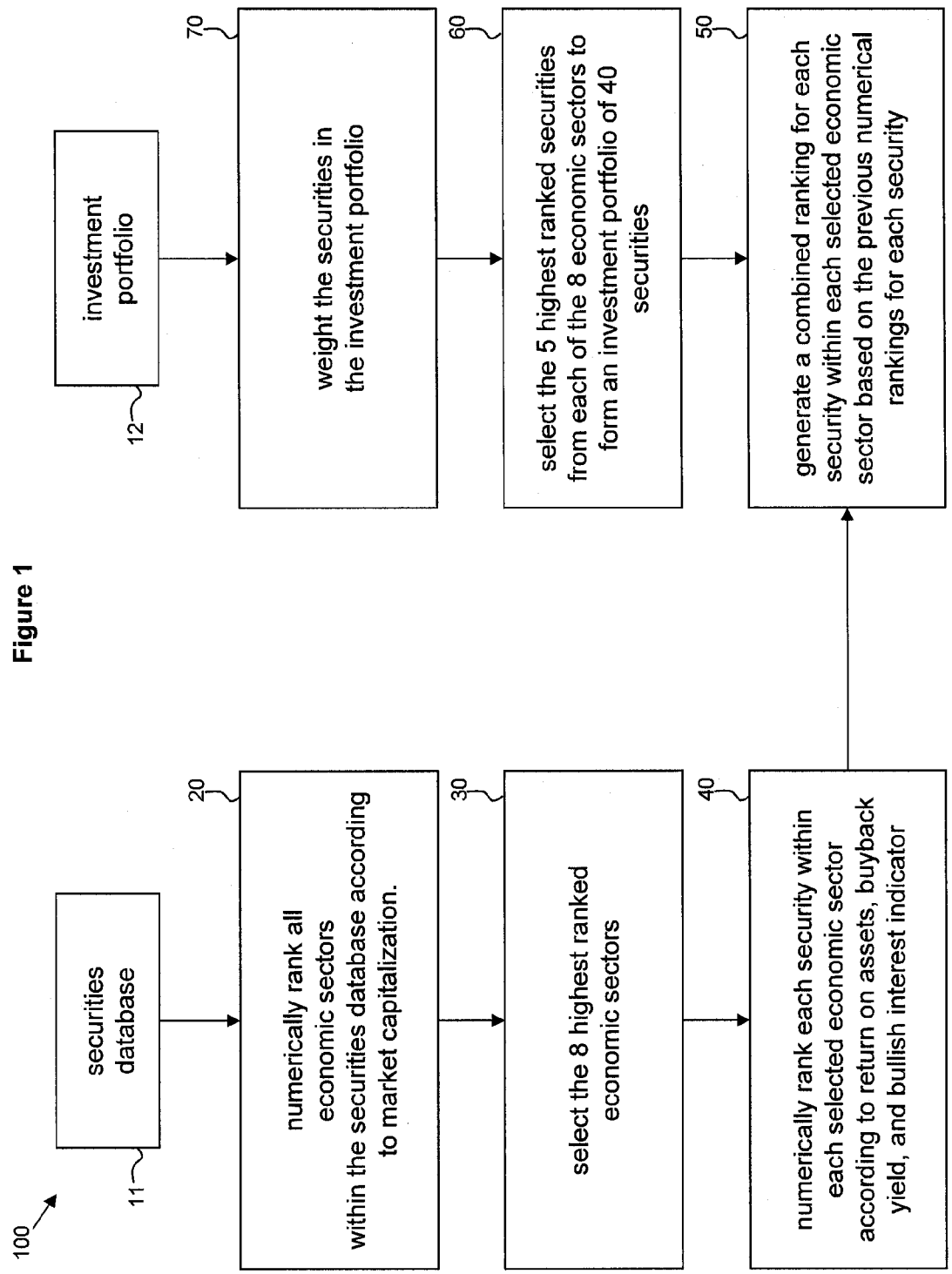
FIG. 1 is a schematic flow chart depicting the steps in an exemplary method of selection of securities in accordance with an embodiment of the present invention.

The Detailed Description Of The Preferred Embodiments of the '657 application is hereby incorporated by reference in its entirety.

There are different methods to select a predetermined number of stocks to form an investment portfolio. One of the method is described in the '657 application.

Referring to the FIG. 1, in accordance with an embodiment of the invention, a securities database 11 is formed by input of data using a conventional PC computer (not shown) in a method 100. The data input includes, the names of, or a representation of, a preselected group of stocks, for example, the five hundred (500) stocks that make up the S&P 500 Index. The S&P 500 Index is a market-weighted index that consists of 500 stocks chosen for market size, liquidity, and economic sector representation. The names of the 500 stocks, or their symbols, or other representative indicia are stored in database 11 to identify the individual stocks.

In addition to the identity of the 500 stocks, other data relating to each stock is also stored in database 11 in association with its respective stock name. Such information may include the identification of the economic sector to which the stock belongs, market capitalization of the stock, and its trailing four quarters' return on assets, buyback yield, and bullish interest indicator.

Different factors such as "return on assets", "buyback yield", and "bullish interest indicator" can be used to evaluate the stocks in securities database 11.

"Return on assets" over the last four quarters, for example, can be measured by quarterly income before extraordinary items, less preferred dividends, divided by average assets value over the past four quarters.

"Buyback yield", for example, measures the percentage decrease in the number of shares outstanding for the last four quarters. In this example, the measure compares shares outstanding as reported in the most recent quarterly report to shares outstanding as reported four quarters earlier. All stocks with rising or flat shares outstanding are given a buyback yield of 0% and, therefore, receive the same ranking.

The "bullish interest indicator", for example, compares the amount of stock traded in the months over the last four quarters in which the price increased to the amount of stock traded in the months over the last four quarters in which the stock price decreased. Whether a month is a rising month or a falling month can be determined by some preset criteria, e.g., by comparing the price of the last trading date with the price of the first trading date of each month. Stocks with a higher percentage of the annual trade volume occurring in rising months receive a higher ranking (expressed as a percentage).

Referring to FIG. 1, in step 20 of method 100, in accordance with an embodiment of the invention, all of the economic sectors of the stocks in database 11 (e.g., Global Industry Classification System Sectors) are numerically ranked according to market capitalization of those sectors on a given day. The market capitalization of a stock can be the market value of all outstanding shares, and can be computed by multiplying the market price of that stock by the number of outstanding shares of that stock. The market capitalization of an economic sector can be simply the sum of the market capitalizations of all the 500 stocks that are in that sector.

Referring to FIG. 2, the market capitalizations (Market Cap.) 201 of a number of economic sectors (Sectors) 202 (ten in this example) can be seen. For example, the market capitalization of sector 1000 is $527,510.63. Each economic sector 202 has a weight 203 which can be simply a percentage of the sector's market capitalization 201 over the total market capitalization of all the ten sectors 202. For example, sector 1000 has a weight 203 of 5.92%, and in this example, all weights 203 of the ten sectors 202 sum to 100%.

In accordance with an embodiment of the present invention, in step 30 (FIG. 1), the economic sectors 202 (FIG. 2) with the eight highest ranked market capitalizations are selected. A sorting algorithm that will compare each sector's capitalization can be used to aid in the selection. The algorithm, for example, weights the market capitalization 201 of each sector 202 and selects the eight sectors with the greatest market capitalizations 204 ("Selected Sector Cap."). A capitalization weight 205 ("Selected Sector Weight") is generated with respect to the eight selected sectors. In accordance with an embodiment of the present invention, the selected sector weights 205 of the eight selected sectors are calculated based on the relative market capitalization of each selected economic sector over the total market capitalization of all the eight selected economic sectors. For example, the weight 203 for sector 1000 was 5.92% whereas its selected sector weight 205 is 6.29%. The weight has changed since the number of selected sectors has decreased the total market capitalization. The selected sector weights 205 of the eight selected economic sectors still sum to 100%.

Each economic sector comprises a number of individual stocks, usually related to a particular industry. Some economic sectors may contain more stocks than other economic sectors. In accordance with an embodiment of the present invention, in step 40 (FIG. 1), the stocks in each selected economic sector are numerically ranked by different factors, for example, by the three factors previously discussed which include the trailing four quarters' return on assets, buyback yield, and bullish interest indicator (i.e., one numeric ranking per factor). If a factor cannot be computed, it is given the lowest possible ranking.

For example, referring to FIG. 3, the five stocks from sector 4000 may end up with the following rankings for each factor as shown in the table below.

| Stock | Factor 1 (return on assets) | Factor 2 (buyback yield) | Factor 3 (bullish interest indicator) | Combined Ranking |
| --- | --- | --- | --- | --- |
| FII | 2 | 21 | 8 | 31 |
| MMC | 5 | 19 | 22 | 46 |
| NFB | 17 | 20 | 9 | 46 |
| WM | 35 | 2 | 10 | 47 |
| TROW | 3 | 14 | 32 | 49 |

Referring to FIG. 1, in step 50, the numerical rankings for each stock (i.e., three rankings for each stock) are summed together to generate a combined numerical ranking, in accordance with an embodiment of the present invention. As a result, each stock in each economic sector will have a combined numerical ranking. For the table above, TROW ends up with a highest combined ranking of 49, WM ends up with a second highest combined ranking of 47, NFB and MMC end up as a the with a third (and fourth) highest combined ranking of 46, and FII with a fifth highest combined ranking of 31.

In accordance with an embodiment of the present invention, in step 60, the five highest ranked stocks, using the combined ranking, from each economic sector are selected to form an investment portfolio 12 of forty (40) stocks. In an embodiment of the present invention, a sorting algorithm may be used to aid in the selection. If a tie in ranking occurs, as that shown in the above table between NFB and MMC, market capitalization may be used to break the tie. For example, the stock with the greatest market capitalization is selected. Accordingly, other factors may be used to break the tie.

After the investment portfolio is formed according to steps 20 to 60 described above, each stock in the portfolio still needs to be weighted to determine the number of shares to be bought for each selected stock. It is understood that other methods and/or different factors can be used to select the investment portfolio, and the investment portfolio formed may contain a different number of securities (other than 40) and/or a different number of sectors (other than eight). For example, the selected sectors' relative weights may be calculated based on factors or indexes other than market capitalizations.

Still referring to FIG. 1, in step 70, the pertinent amount of each of the stocks in the investment portfolio is determined. The stocks are weighted such that each stock in the portfolio will comprise a particular number of shares of that stock (i.e., a number of shares or the dollar amount of shares to be purchased for each stock in the investment portfolio). The five stocks from each economic sector are weighted according to the relative market capitalization of each stock within the economic sector, in accordance with an embodiment of the present invention, to give an intra sector weight of each stock. Factors or indexes other than market capitalizations may be used to calculate the intra sector weight of each stock.

Referring to FIG. 3, five stocks 206 (FII, MMC, NFB, WM and TROW) are weighted to generate an intra sector weight 207. The intra sector weight 207 is the capitalization of the particular stock 206 as a percentage of the total capitalization for the five (5) stocks 206. The weighting given to the five stocks is 3.81%, 34.82%, 6.68%, 49.82% and 5.78% respectively. For example, the 3.81% number is calculated as the market capitalization for the FII stock (3,026.56) divided by the total market capitalization of the five stocks 206 (79,509.00), multiplied by 100. The percentage weightings for the five stocks sum to a total of 100%.

Across the investment portfolio 12 (FIG. 1), the five stocks from each economic sector are weighted according to the relative market capitalizations of the 8 economic sectors and a predetermined percentage, in accordance with an embodiment of the present invention. Referring to FIG. 2, the total selected sector weight 205 of the sector 4000 is 22.04% which is the percent market capitalization for that economic sector 4000 relative to the total market capitalization for the eight sectors. The intra sector weight 207 (FIG. 3) of each of the five stocks 206 (FII, MMC, NFB, WM and TROW) within sector 4000 is multiplied by 22.04% (the selected sector weight 205) and thereafter multiplied by a predetermined percentage, 40%, in accordance with an embodiment of the present invention, to give a weight dependent on the selected stock's intra stock weight, i.e. the capitalization-weighted weight 208 ("Cap-weighted Weight"), for each of the 5 selected stocks 206. The other 60% of the selected sector weight 205 is distributed equally to the five stocks 206. That is, 60% of the 22.04% is divided by five and shared by the five stocks as an equal-weighted weight 209. The cap-weighted weight 208 is added to the equal-weighted weight 209 to yield a portfolio weight 210 of the selected stock. The total portfolio weight 210 of the five stocks 206 (FII, MMC, NFB, WM and TROW) within the selected sector 4000 is still 22.04%, the selected sector weight 205.

Thus, for example, FII will be given a 0.336% cap-weighted weight 208, a 2.645% equal-weighted weight 209 and a 2.98% portfolio weight 210. Thus, FII will receive a 2.98% portfolio weight 210 within the investment portfolio 12. The following equation illustrates the calculation of FII's portfolio weight 210:

(Weight 207)×(Weight 205)×40%+((Weight 205)×60%)/5=3.81%×22.04%×40%+(22.04%×60%)/5=0.336%+2.645%=2.98%

A unit investment trust (UIT) is a professionally selected, diversified portfolio of stocks, bonds, or other securities that remains as a fixed portfolio throughout the life of the trust. It may be seen that the investment portfolio 12 may constitute a UIT. The trust will terminate on a mandatory termination date, which will typically be approximately 15 months from the initial date of deposit. Twelve-month termination dates are also contemplated. However, the duration of the investment vehicle is not limited to any particular length of time.

Some possible features and benefits of such a unit investment trust or other pooled vehicle or investment account may be summarized as follows (although these are not essential features of embodiments of the present invention):

Known Portfolio

The present method produces a specific portfolio giving investors the comfort of knowing what they own.

Diversification

Portfolios produced by the present method can be diversified across many different securities, offering a portfolio for almost every asset allocation need.

Low Expenses

Portfolios selected pursuant to the present method offer significantly lower expenses than other packaged products.

Daily Liquidity

Units may be redeemed on any business day at the redemption price, which may be more or less than the original purchase price. There is no cost to liquidate.

Professional Portfolio Selection and Supervision

Once the portfolio is chosen, the holdings of the portfolio are supervised, eliminating the need of individual investors to oversee each security.

Fully Invested in the Market

Portfolios selected pursuant to the present method have limited cash positions so more of the investor's money is working in the market.

Ease of Ownership

With one low minimum purchase, investors can own a diversified portfolio of securities without making a substantial commitment of time or capital.

Embodiments of the present invention are not limited to the selection of securities for funding a unit investment trust. Securities may be selected for funding any type of pooled investment vehicle or investment account. The present invention could also be used in connection with variable annuities, open-ended mutual funds, an investment account, etc.

Also, embodiments of the present invention are not limited to the S&P 500 Index. Other stock indexes or groups of stocks may also be used as the starting point for the securities database 11.

In an embodiment of the present invention, the method 100 is implemented on a personal computer.

In summary, aspects of the present invention provide for selecting a securities portfolio based on market capitalization, return on assets, buyback yield, and bullish interest indicator.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A computer implementation method for deciding the quantity of shares of each security selected to form an investment portfolio, comprising the steps of:

selecting securities from selected economic sectors in order to establish an investment portfolio;

weighting said selected economic sectors to provide a sector weight for each selected economic sector;

weighting said selected securities from said each selected economic sector to provide an intra sector weight for each selected security;

determining a first weight of said each selected security according to (1) said intra sector weight of said each selected security and (2) a predetermined percentage of said sector weight of said each selected security's economic sector;

determining a second weight of said each selected security by equally dividing the remaining percentage of said sector weight of said each selected security's economic sector among the selected securities from said each selected security's economic sector; and adding said first weight to said second weight of said each selected security to yield a portfolio weight of said each selected security, wherein at least one of said steps is performed by a computer.

2. The method of claim 1, wherein said sector weight of said each selected economic sector is determined by weighting said each selected economic sector according to a relative market capitalization of said each selected economic sector as compared to the total market capitalization of said selected economic sectors.

3. The method of claim 1, wherein said intra sector weight of said each selected security is determined by weighting said each selected security according to a relative market capitalization of said each selected security as compared to the total market capitalization of all selected securities from said each selected security's economic sector.

4. The method of claim 1, wherein said first weight of said each selected security is a capitalization-weighted weight dependent on the relative market capitalization of said each selected security within all selected securities from said each selected security's economic sector and dependent on the relevant market capitalization of said each selected security's economic sector within all selected economic sectors.

5. The method of claim 1 wherein said selected securities are from the group of securities comprises the 500 stocks that make up the Standard and Poor's 500 Composite Stock Price Index.

6. The method of claim 1 wherein said selected economic sectors comprise eight economic sectors.

7. The method of claim 1 wherein said selected securities comprises 5 securities from said each selected economic sector.

8. The method of claim 1 wherein the predetermined percentage is 40%.

9. The method of claim 1 wherein the step of determining said first weight of said each selected security comprising:
(a) multiplying said ultra sector weight of said each selected security by said sector weight of said each selected security's economic sector; and
(b) multiplying the result of said step (a) by said predetermined percentage, wherein said steps (a) and (b) are performed by the computer.

10. The method of claim 9 wherein the step of determining said second weight of said selected securities comprising:
(a) subtracting said predetermined percentage from 100%;
(b) dividing the result from said subtraction by the number of selected securities from said each selected security's economic sector; and
(c) multiplying the result from said division by said sector weight of said each selected security's economic sector, wherein said steps (a), (b) and (c) are performed by the computer.

11. The method of claim 1 further comprising purchasing said selected securities from said selected economic sectors, said purchased securities thereby forming said investment portfolio.

12. The method of claim 1 further comprising creating a pooled investment vehicle comprising said selected securities from said selected economic sectors.

13. The method of claim 1 further comprising creating a variable annuity comprising said selected securities from said selected economic sectors.

14. The method of claim 1 further comprising creating an investment account comprising said selected securities from said selected economic sectors.

15. The method of claim 1 further comprising creating an open-ended mutual fund comprising said selected securities from said selected economic sectors.

16. The method of claim 1 wherein said method is implemented on a computer as a software application program.

17. The method of claim 1 further comprising generating a securities database that may be stored, executed, and used by a computer.

18. The method of claim 1 wherein said investment portfolio is generated and stored as a computer file within said computer implementation.

19. The method of claim 1 wherein a sorting algorithm is used in said selecting a predetermined number of economic sectors and said selecting a predetermined number of securities.

* * * * *